United States Patent [19]
Tzou

[11] Patent Number: 4,698,689
[45] Date of Patent: Oct. 6, 1987

[54] PROGRESSIVE IMAGE TRANSMISSION

[75] Inventor: Kou-Hu Tzou, Bedford, Mass.

[73] Assignee: GTE Laboratories Incorporated, Waltham, Mass.

[21] Appl. No.: 845,739

[22] Filed: Mar. 28, 1986

[51] Int. Cl.4 .................. H04N 1/00; H04N 7/12
[52] U.S. Cl. ....................... 358/260; 358/133; 358/135; 382/56; 364/725
[58] Field of Search ............... 358/133, 260, 135, 136; 382/56; 364/723, 725, 826

[56] References Cited

U.S. PATENT DOCUMENTS

| | | | |
|---|---|---|---|
| 4,152,772 | 5/1979 | Speiser et al. | 364/725 |
| 4,179,709 | 12/1979 | Workman | 358/133 |
| 4,189,748 | 2/1980 | Reis | 358/133 |
| 4,222,076 | 9/1980 | Knowlton | 358/263 |
| 4,261,018 | 4/1981 | Knowlton | 358/263 |
| 4,302,775 | 11/1981 | Widergren et al. | 358/136 |
| 4,355,337 | 10/1982 | Sekigawa | 358/284 |
| 4,394,774 | 7/1983 | Widergren et al. | 382/56 |
| 4,567,518 | 1/1986 | Driessen | 358/133 |
| 4,672,444 | 6/1987 | Bergen et al. | 358/133 |

OTHER PUBLICATIONS

Takikawa; "Fast Progressive Reconstruction of a Transformed Image"; IEEE Information Theory; vol. IT-30, No. 1, pp. 111–117; Jan. 1984.
Ngan; "Image Display Techniques Using the Cosine Transform"; IEEE Trans. Acoustic, Speech and Signal Processing, vol. ASSP-32, No. 1, pp. 173, 177; Feb. 1984.
Tescher and Cox; "An Adaptive Transform Coding Algorithm"; ICC Conference Records, pp. 47.20–47.25, 1976.
Ahmed, Natarajan and Rao; "Discrete Cosine Transform", IEEE Transactions on Computers, vol. C-23, pp. 90–93, Jan. 1974.
Ngan, "Adaptive Transform Coding of Video Signals", IEEE Proc., part F, vol. 129, No. 1, pp. 28–40, Feb. 1982.
Davisson; "Rate–Distortion Theory and Applications", IEEE Proc., vol. 50, pp. 800–808, 1972.
Max, "Quantizing for Minimum Distortion", IRE Trans. Information Theory, vol. IT-6, pp. 7–12, Mar. 1960.

Primary Examiner—Howard W. Britton
Assistant Examiner—John K. Peng
Attorney, Agent, or Firm—David M. Keay

[57] ABSTRACT

System and method of progressively transmitting and reconstructing an image in which an approximate image is reconstructed based upon partial information and details are added as additional information becomes available. The image is divided into an array of blocks of picture elements and the data for each block is subjected to a two-dimensional transformation to provide transform coefficients thereof. The transform coefficients are quantized into a series of sets of quantized transform coefficients, each quantized transform coefficient being represented by a number of bits. Different numbers of bits are assigned to each quantized transform coefficient of each set of the series to represent the corresponding transform coefficient in increasingly finer detail. During each of a plurality of transmission sequences, signals representing the differences between each set of quantized transform coefficients and the preceding set of the series for each block are transmitted. The signals representing the differences between each set are combined as they are received to provide cumulative quantized transform coefficients for each block in increasingly finer detail after each transmission sequence. The cumulative quantized transform coefficients are dequantized to reconstituted transform coefficients which undergo an inverse of the two-dimensional transformation to provide reconstituted image data for each picture element of each block, the reconstituted image data being of increasingly finer detail after later transmission sequences.

35 Claims, 6 Drawing Figures

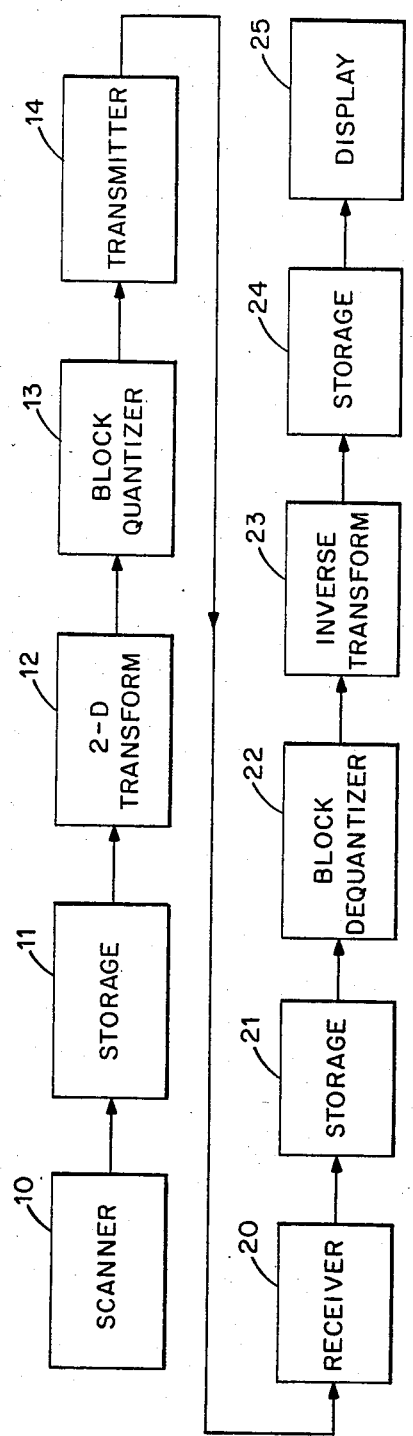

PROGRESSIVE IMAGE TRANSMISSION

BACKGROUND OF THE INVENTION

This invention relates to the transmission of pictorial image data. More particularly, it is concerned with the progressive transmission and reconstruction of coded images in which an approximate image is reconstructed based upon partial information and details are added as additional information becomes available.

The progressive transmission and reconstruction of coded images allows an approximate image based upon partially received information to be constructed to which additional details are added as additional information becomes available. This procedure has various applications in the field of image communications, such as for interactive picture retrieving, variable-rate video conferencing, and the quick display of freeze-frame image transmission. One relatively simple scheme proposed by Knowlton U.S. Pat. No. 4,222,076 issued Sept. 9, 1980, deals with spatial domain data for the progressive transmission of gray-scale pictures. This approach has the advantages of simplicity in implementation and no coding distortion in the final reconstructed image. However, due to the nature of successive picture subdivision introduced by this method, the number of accumulated bits of information increases exponentially with each interation.

Other schemes that deal with transform domain data have been described in articles by Takikawa "Fast Progressive Reconstruction of A Transformed Image," IEEE Trans. Inform. Theory, vol. IT-30, pp. 111–117, January 1984 and Ngan "Image Display Techniques Using the Cosine Transform," IEEE Trans. Acoust., Speech, Signal Processing, vol. ASSP-32, No. 1, pp. 173–177, February 1984. Transform image coding is well known for its compression efficiency. Its nature renders it also suitable for efficient progressive transmission and reconstruction since low frequency transform coefficients contain most of the energy of image signals. Thus, a small subset of the transform coefficients is good enough for reconstructing a rough version of the whole image, while the remainder of the transform coefficients allow the receiver to add details to the initially reconstructed picture as they are received. In one such scheme the transform coefficients of each block of image data are considered as arranged in a square lattice and are sent and received in a zig-zag pattern in order from the large through the small variance values. This scheme is described in an article of Tescher and Cox "An Adaptive Transform Coding Algorithm," ICC Conference Records, pp. 47.20–24, 1976. Although the zig-zag technique provides better compression efficiency than other proposed transform domain schemes, it is desirable to further improve the efficiency with which image data can be transmitted, particularly during the first few iterations.

SUMMARY OF THE INVENTION

The improved method of progressively transmitting an image in accordance with the present invention comprises dividing an image into a predetermined array of zones of picture elements. A predetermined spatial domain-to-transform domain transformation is performed on the picture elements of each zone to provide transform coefficients thereof. Signals containing data representing transform coefficients in different degrees of detail are produced and transmitted for each zone during the first of a plurality of transmission sequences. Signals containing data on transform coefficients which when combined with the data transmitted during preceding sequences provide cumulative data representing the transform coefficients of the zone in increasingly finer detail are produced and transmitted for each zone during subsequent sequences of the plurality of sequences.

In reconstructing the image, the signals containing data representing transform coefficients in different degrees of detail transmitted during the first transmission sequence and the signals containing data on transform coefficients transmitted during subsequent sequences are received. The signals containing data on transform coefficients transmitted during each transmission sequence subsequent to the first are combined with corresponding signals transmitted during preceding transmission sequences including the first to provide cumulative signals containing data on transform coefficients for each zone. The inverse of the predetermined spatial domain-to-transform domain transformation is performed on the cumulative signals containing data on transform coefficients for each zone after selected transmission sequences to provide reconstituted image data for each picture element of each zone. The reconstituted image data is of finer detail after later transmission sequences in the plurality.

A system in accordance with the present invention for progressively transmitting an image comprises means for dividing an image into a predetermined array of zones of picture elements and transform means for performing a predetermined spatial domain-to-transform domain transformation of the picture elements of each zone to provide transform coefficients thereof. The system includes means for producing and transmitting for each zone during the first of a plurality of transmission sequences signals containing data representing transform coefficients in different degrees of detail, and means for producing and transmitting for each zone during each subsequent sequence of said plurality of sequences signals containing data on transform coefficients which when combined with data transmitted during preceding sequences provide cumulative data representing the transform coefficients of the zone in increasingly finer detail.

For reconstructing the image the system comprises receiver means for receiving for each zone said signals containing data representing transform coefficients in different degrees of detail transmitted during said first of said plurality of transmission sequences and said signals containing data on transform coefficients transmitted during each subsequent sequence of said plurality of transmission sequences. Means are included for combining signals containing data on transform coefficients transmitted during each transmission sequence subsequent to the first with corresponding signals transmitted during preceding transmission sequences including the first to provide cumulative signals containing data on transform coefficients for each zone. Inverse transform means are also included for performing the inverse of said predetermined spatial domain-to-transform domain transformation of cumulative signals containing data on transform coefficients for each zone after selected transmission sequences to provide reconstituted image data for each picture element of each zone, the reconstituted image data being of finer detail after later transmission sequences in the plurality.

BRIEF DESCRIPTION OF THE DRAWINGS

In the drawings:

FIG. 1 is a block diagram representing apparatus for progressively transmitting and reconstructing an image in accordance with the present invention;

FIGS. 2A and 2B illustrate a set of exemplary bit assignment matrices useful in explaining the present invention;

FIG. 3 is an exemplary standard deviation matrix from which the bit assignment matrices of FIGS. 2A and 2B are designed;

Figure 4:
FIG. 4 illustrates stages in the progressive reconstruction of an image in accordance with the present invention.

For a better understanding of the present invention, together with other and further objects, advantages, and capabilities thereof, reference is made to the following disclosure and appended claims in connection with the above-described drawings.

DETAILED DESCRIPTION

General

FIG. 1 is a block diagram representing a system for the progressive transmission and reconstruction of images in accordance with the present invention. The system includes a scanner 10 for scanning an image in two directions and producing information on each picture element (pixel) of the image. This information is placed in storage 11 in digital format to be appropriately addressed by zones, or blocks, of pixel data corresponding to predetermined portions of the image area.

Each block of data is transformed by a two-dimensional spatial domain-to-transform domain transformation function in a two-dimensional transform 12. One form of two-dimensional transformation which has been found particularly suitable is the discrete cosine transformation as described in an article by Ahmed, Natarajan, and Rao "Discrete Cosine Transform," IEEE Transaction on Comput., Vol. C-23, pp. 90-93, January 1974. The transformation produces a set of transform coefficients for each block which are quantized in a block quantizer 13.

The block quantizer 13 quantizes each transform coefficient of a block in varying degrees of precision for each of several iterations to produce a series of sets of quantized values. That is, on each succeeding iteration, a greater number of bits are assigned to represent the values of the coefficients of different ones of the coefficients. The total number of bits assigned to the quantized values increases by the same amount for each iteration. That is, on the first iteration values for several of the coefficients of the set are expressed in different numbers of bits which add to a total number of bits for the set. On each subsequent iteration that same number of bits is added and the total number reassigned to provide image data on the values of the coefficients in greater detail. For each iteration the bits added to each set are transmitted during a transmission sequence by a transmitter 14 and conducted over a suitable transmission channel to a receiver 20.

The receiver 20 receives the information during each transmission sequence for each iteration on each block and stores the bits in storage 21. After each iteration, or transmission sequence, the data available on the transform coefficients for each block is increased by the amount being sent, thus providing greater information on the image details. This data is accumulated in storage 21 by combining the bits received during each transmission sequence with those previously received.

At any stage in the sequence of iterations, the accumulated bits representing the transform coefficients of each set may be removed from storage 21 and processed in a block dequantizer 22 to re-establish the transform coefficient values to the extent of precision possible with the accumulated data available. This information is subjected to the inverse of the previous spatial domain-to-transform domain transformation in an inverse transform 23 to produce reconstituted image data in the spatial domain. This data is placed in storage 24 and is available for display on a display 25. The display reproduces the image data in greater detail upon subsequent iterations or transmission sequences. Thus, the transmitted image is progressively reconstructed in successively finer detail during successive transmission sequences, and transmission may be stopped after any transmission sequence up to transmission of final detail.

DESIGN OF BIT ASSIGNMENT MAPS

In a progressive transmission and reconstruction system where $\Delta B_i$ bits of the total for an image are transmitted at the i-th step of progression, the number of accumulated information bits at the i-th step of progression is $$\sum_{j=1}^{i} \Delta B_j = B_i$$

In a practical system it is preferred that the number of information bits transmitted at each iteration be fixed, i.e., $\Delta B_i = \Delta B$ for any i. Therefore, the number of accumulated information bits can be rewritten as $B_i = i \cdot \Delta B$. For the present discussion nonadaptive spatial domain-to-transform domain coding with a zonal bit assignment scheme in which the number of information bits allocated is the same from block to block is employed. The scheme may be extended to adaptive transform coding if desired in accordance with the teachings in an article by Ngan "Adaptive Transform Coding of Video Signals," IEEE Proc. part F, vol. 129, no. 1, pp. 28-40, February 1982. The image is partitioned into L blocks for transform coding. Information bits allocated to each block are $\Delta B/L$ bits/iteration. If the block size is $N \times N$ pixels, the incremental bit rate for each iteration is $\Delta B/(L \cdot N^2) = \Delta r$ bits/pixel-iteration, and the accumulated bit rate is $i \cdot \Delta r$ at the i-th iteration.

In order to minimize distortion in the reconstructed image, $$\sum_k \sum_l [u(k,l) - u_i(k,l)]^2$$

is minimized for all i's where $\hat{u}(k,l)$ is the original pixel value and $u_i(k,l)$ is the reconstructed pixel value at the i-th iteration at pixel location (k,l). In zonal transform coding minimization of the equation is obtained by designing an optimal bit assignment matrix, also called bit assignment map, for the transform coefficients of the blocks. One method to design the bit assignment map for a given bit rate is based upon rate-distortion theory as discussed by Davisson "Rate Distortion Theory and Applications," Proc. IEEE, vol. 60, pp. 800-808, 1972.

The rate-distortion theoretic approach assumes that the transform coefficients are independently Gaussian distributed and allocates a number of bits to a coefficient according to its standard deviation. The optimally assigned number of bits for each coefficient is then rounded to its nearest integer and the negative values are set to zero. Let $b_i(k,l)$ and $b_{i+1}(k,l)$ be the numbers of bits allocated to the transform coefficient at $(k,l)$ in the i-th and (i+1)th iterations, respectively. The number of bits, $\Delta b_{i+1}(k,l)$, corresponding to the incremental information $\Delta b_{i+1}(k,l)$ to be sent for the coefficient at $(k,l)$ in the (i+1)th iteration is $$\Delta b_{i+1}(k,l) = b_{i+1}(k,l) - b_i(k,l).$$

The bit assignment rule based upon rate-distortion theory guarantees $\Delta b_{i+1}(k,l)$ to be always nonnegative.

Bit Assignment Maps of FIGS. 2A and 2B

Figures 2A, 2B:
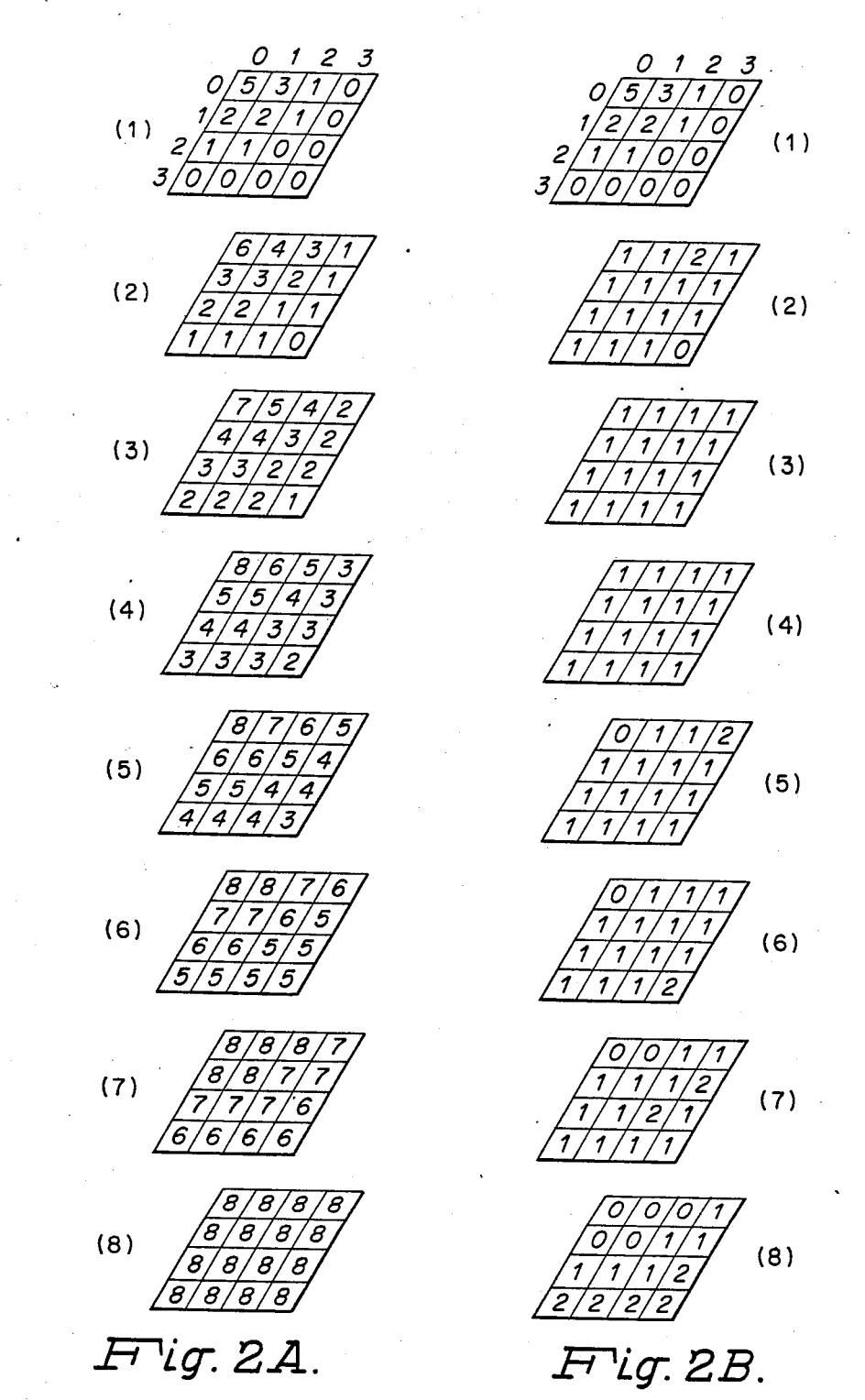

An example of bit assignment maps and corresponding incremental bit assignment maps designed for an image with the standard deviation matrix shown in the table of FIG. 3 at the incremental bit rate of 1 bit/pixel-iteration is shown in FIGS. 2A and 2B. FIG. 2A(1)-(8) indicate the number of bits assigned to each quantized transform coefficient of a block to provide a series of sets of quantized transform coefficients. FIG. 2B(1)-(8) indicates the assignment of bits added on each iteration to generate the sets of FIG. 2A(1)-(8), respectively. The data corresponding to each of the incremental bit assignment maps of FIG. 2B(1)-(8) is transmitted during each of a plurality of transmission sequences.

The sequence of bits allocated to each transform coefficient can be read from the maps at its corresponding location. For example, the bit assignment sequence is "51110000" for the DC term (0,0) and "31111100" for the AC term at (0,1). See FIG. 2B(1)-(8). The total number of bits assigned to each transform coefficient is 8 in order to match the resolution of the input image. See FIG. 2A(8). The scheme can be viewed as slicing the full bit assignment map into layers of incremental bit assignment maps and sending the information corresponding to a slice of the full bit assignment map at each iteration or transmission sequence. As shown in FIG. 2B(1) there are 8 coefficients transmitted, at various degrees of precisions, in the first iteration.

When the incremental bit rate is reduced, the total number of incremental bit assignment maps is increased. The overhead information corresponding to those maps may be large if the incremental bit rate is very small. In any event, there is no need to send the incremental maps as side information, since both the transmitter and receiver can design the same maps based upon the standard deviations of transform coefficients that are transmitted beforehand, a modest amount of side information.

Embedded Quantization

The progressive image transmission and reconstruction scheme described above requires the quantizer and the dequantizer to operate so as to make progressively finer reconstructions based upon the already received information combined with the additional information received at each iteration. In the example illustrated by the bit assignment matrices of FIGS. 2A and 2B, 5 bits are allocated to the DC component (0,0) in the first iteration (FIG. 2B(1)) and one additional bit in each of the next three iterations (FIGS. 2B(2), (3), and (4)). Therefore, the DC term is initially quantized by a 5-bit quantizer (FIG. 2A(1)); quantization is refined to 6 bits in the second iteration (FIG. 2A(2)), to 7 bits in the third iteration (FIG. 2A(3)), and so forth. Let $y_i$ and $y_{i+1}$ be the binary representations of the $b_i$- and $b_{i+1}$-bit quantizer outputs corresponding to a transform coefficient x respectively; then $y_{i+1}$ should be able to be represented as $(y_i, \Delta y_{i+1})$ so that the previous output symbol is embedded within the current output symbol. Consequently, a finer reconstruction value $x_{i+1}$ can be obtained from the already received $y_i$ and the additional information $\Delta y_{i+1}$ in the (i+1)th iteration.

An embedded quantization scheme is achieved by aligning the thresholds (the value which determines whether a 0 or a 1 will be the assigned digit) of succeeding levels of quantization. In designing the particular thresholds, and the reconstructed values to be assigned to each 0 or a 1 upon dequantization, a particular quantizer is chosen as the reference and the values are determined with regard to the mean-squared quantization error. In addition, since the DC transform coefficient has a Gaussian distribution and the other coefficients, the AC coefficients, a Laplacian distribution, the thresholds and reconstructed levels for DC and AC coefficients are different. Tables 1 and 2 give suitable threshold and reconstructed levels having threshold aligned quantization for a Gaussian distributed value and a Laplacian distributed value, respectively, quantized from 1 to 8 bits. Only the positive levels are shown in Tables 1 and 2, the negative levels being symmetric therewith. Thus, the values of the transform coefficients quantized at each iteration (FIG. 2A(1)-(8)) in accordance with the threshold levels of Tables 1 and 2 and reconstructed as received data is accumulated in accordance with the reconstructed levels of Tables 1 and 2 provides an embedded quantizing scheme for accumulating information over a sequence of iterations.

TABLE 1

| Threshold aligned nonuniform quantizer: Gaussian source |
|---|
| Threshold levels for 1 bit |
| 0.0000 |
| Threshold levels for 2 bits |
| 0.0000,1.0993 |
| Threshold levels for 3 bits |
| 0.0000,0.5224,1.0993,1.8435 |
| Threshold levels for 4 bits |
| 0.0000,0.2582,0.5224,0.7996,1.0993,1.4371,1.8435,2.4008 |
| Threshold levels for 5 bits |
| 0.0000,0.1288,0.2582,0.3892,0.5224,0.6589,0.7996,0.9459, 1.0993,1.2622,1.4371,1.6290,1.8435,2.0945,2.4008,2.8843 |
| Threshold levels for 6 bits |
| 0.0000,0.0643,0.1288,0.1934,0.2582,0.3235,0.3892,0.4555, 0.5224,0.5902,0.6589,0.7286,0.7996,0.8719,0.9459,1.0216, 1.0993,1.1794,1.2622,1.3479,1.4371,1.5307,1.6290,1.7329, 1.8435,1.9639,2.0945,2.2389,2.4008,2.6166,2.8843,3.3159, |
| Threshold levels for 7 bits |
| 0.0000,0.0322,0.0643,0.0965,0.1288,0.1610,0.1934,0.2257, 0.2582,0.2908,0.3235,0.3563,0.3892,0.4222,0.4555,0.4888, 0.5224,0.5562,0.5902,0.6244,0.6589,0.6936,0.7286,0.7639, 0.7996,0.8356,0.8719,0.9087,0.9459,0.9835,1.0216,1.0602, 1.0993,1.1391,1.1794,1.2204,1.2622,1.3047,1.3479,1.3921, 1.4371,1.4834,1.5307,1.5792,1.6290,1.6802,1.7329,1.7873, 1.8435,1.9025,1.9639,2.0277,2.0945,2.1648,2.2389,2.3173, 2.4008,2.5038,2.6166,2.7422,2.8843,3.0759,3.3159,3.7087 |
| Threshold levels for 8 bits |
| 0.0000,0.0161,0.0322,0.0482,0.0643,0.0804,0.0965,0.1126, 0.1288,0.1449,0.1610,0.1772,0.1934,0.2095,0.2257,0.2420, 0.2582,0.2745,0.2908,0.3071,0.3235,0.3398,0.3563,0.3727, 0.3892,0.4057,0.4222,0.4388,0.4555,0.4721,0.4888,0.5056, 0.5224,0.5393,0.5562,0.5732,0.5902,0.6073,0.6244,0.6416, 0.6589,0.6762,0.6936,0.7111,0.7286,0.7462,0.7639,0.7817, 0.7996,0.8175,0.8356,0.8537,0.8719,0.8903,0.9087,0.9272, |

TABLE 1-continued
Threshold aligned nonuniform quantizer: Gaussian source 0.9459,0.9646,0.9835,1.0025,1.0216,1.0408,1.0602,1.0797,
1.0993,1.1191,1.1391,1.1592,1.1794,1.1999,1.2204,1.2412,
1.2622,1.2833,1.3047,1.3262,1.3479,1.3699,1.3921,1.4145,
1.4371,1.4601,1.4834,1.5069,1.5307,1.5548,1.5792,1.6040,
1.6290,1.6544,1.6802,1.7064,1.7329,1.7599,1.7873,1.8152,
1.8435,1.8728,1.9025,1.9329,1.9639,1.9955,2.0277,2.0607,
2.0945,2.1292,2.1648,2.2013,2.2389,2.2775,2.3173,2.3584,
2.4008,2.4512,2.5038,2.5589,2.6166,2.6777,2.7422,2.8109,
2.8843,2.9755,3.0759,3.1882,3.3159,3.4896,3.7087,4.0712

Reconstruction levels for 1 bits
0.7980
Reconstruction levels for 2 bits
0.4968,1.6052
Reconstruction levels for 3 bits
0.2553,0.7887,1.4060,2.2354
Reconstruction levels for 4 bits
0.1284,0.3880,0.6568,0.9423,1.2562,1.6180,2.0690,2.7326
Reconstruction levels for 5 bits
0.0643,0.1932,0.3232,0.4551,0.5897,0.7280,.0.8712,1.0206,
1.1781,1.3462,1.5284,1.7296,1.9588,2.2303,.2.5928,3.1757
Reconstruction levels for 6 bits
0.0322,0.0965,0.1610,0.2257,0.2907,0.3562,0.4222,0.4887,
0.5561,0.6243,0.6935,0.7638,0.8354,0.9085,0.9832,1.0599,
1.1387,1.2201,1.3043,1.3916,1.4828,1.5786,1.6795,1.7864,
1.9014,2.0263,2.1629,2.3148,2.4990,2.7342,3.0536,3.5782
Reconstruction levels for 7 bits
0.0161,0.0482,0.0804,0.1126,0.1449,0.1772,0.2095,0.2420,
0.2745,0.3071,0.3398,0.3727,0.4057,0.4388,0.4721,0.5056,
0.5392,0.5731,0.6072,0.6416,0.6762,0.7110,0.7462,0.7817,
0.8175,0.8536,0.8902,0.9272,0.9646,1.0024,1.0407,1.0796,
1.1190,1.1591,1.1998,1.2411,1.2832,1.3261,1.3698,1.4144,
1.4600,1.5068,1.5547,1.6038,1.6543,1.7062,1.7597,1.8150,
1.8725,1.9326,1.9951,2.0604,2.1288,2.2008,2.2769,2.3577,
2.4502,2.5575,2.6759,2.8085,2.9710,3.1807,3.4687,3.9487
Reconstruction levels for 8 bits
0.0080,0.0241,0.0402,0.0563,0.0724,0.0885,0.1046,0.1207,
0.1368,0.1529,0.1691,0.1853,0.2014,0.2176,0.2339,0.2501,
0.2664,0.2826,0.2989,0.3153,0.3317,0.3480,0.3645,0.3809,
0.3974,0.4140,0.4305,0.4471,0.4638,0.4805,0.4972,0.5140,
0.5308,0.5477,0.5647,0.5816,0.5987,0.6158,0.6330,0.6502,
0.6675,0.6849,0.7023,0.7198,0.7374,0.7550,0.7728,0.7906,
0.8085,0.8265,0.8446,0.8628,0.8811,0.8994,0.9179,0.9365,
0.9552,0.9740,0.9929,1.0120,1.0312,1.0504,1.0699,1.0894,
1.1092,1.1290,1.1491,1.1693,1.1896,1.2101,1.2308,1.2516,
1.2727,1.2939,1.3154,1.3370,1.3589,1.3809,1.4032,1.4258,
1.4486,1.4717,1.4951,1.5187,1.5427,1.5670,1.5915,1.6164,
1.6416,1.6672,1.6932,1.7196,1.7463,1.7735,1.8011,1.8292,
1.8580,1.8875,1.9176,1.9482,1.9795,2.0114,2.0441,2.0774,
2.1117,2.1468,2.1828,2.2198,2.2579,2.2971,2.3375,2.3792,
2.4255,2.4770,2.5307,2.5870,2.6463,2.7090,2.7755,2.8463,
2.9279,3.0231,3.1287,3.2476,3.3942,3.5849,3.8489,4.2935/

TABLE 2
Threshold aligned nonuniform quantizer: Laplacian source
Threshold levels for 1 bit
0.0000
Threshold levels for 2 bits
0.0000,1.3444
Threshold levels for 3 bits
0.0000,0.5667,1.3444,2.5971
Threshold levels for 1 bits
0.0000,0.2644,0.5667,0.9198,1.3444,1.8776,2.5971,3.7240
Threshold levels for 5 bits
0.0000,0.1281,0.2644,0.4102,0.5667,0.7359,0.9198,1.1215,
1.3444,1.5942,1.8776,2.2068,2.5971,3.0852,3.7240,4.8509
Threshold levels for 6 bits
0.0000,0.0631,0.1281,0.1951,0.2644,0.3360,0.4102,0.4870,
0.5667,0.6496,0.7359,0.8259,0.9198,1.0182,1.1215,1.2300,
1.3444,1.4656,1.5942,1.7312,1.8776,2.0358,2.2068,2.3929,
2.5971,2.8271,3.0852,3.3805,3.7240,4.2121,4.8509,5.9777
Threshold levels for 7 bits
0.0000,0.0313,0.0631,0.0953,0.1281,0.1613,0.1951,0.2295,
0.2644,0.2999,0.3360,0.3728,0.4102,0.4482,0.4870,0.5265,
0.5667,0.6078,0.6496,0.6923,0.7359,0.7804,0.8259,0.8723,

TABLE 2-continued
Threshold aligned nonuniform quantizer: Laplacian source 0.9198,0.9684,1.0182,1.0692,1.1215,1.1750,1.2300,1.2864,
1.3444,1.4041,1.4656,1.5290,1.5942,1.6616,1.7312,1.8031,
1.8776,1.9552,2.0358,2.1196,2.2068,2.2978,2.3929,2.4926,
2.5971,2.7090,2.8271,2.9523,3.0852,3.2277,3.3805,3.5453,
3.7240,3.9540,4.2121,4.5074,4.8509,5.3390,5.9777,7.1046

Threshold levels for 8 bits
0.0000,0.0156,0.0313,0.0471,0.0631,0.0791,0.0953,0.1116,
0.1281,0.1446,0.1613,0.1782,0.1951,0.2122,0.2295,0.2469,
0.2644,0.2821,0.2999,0.3179,0.3360,0.3543,0.3728,0.3914,
0.4102,0.4291,0.4482,0.4675,0.4870,0.5066,0.5265,0.5465,
0.5667,0.5871,0.6078,0.6286,0.6496,0.6709,0.06923,0.7140,
0.7359,0.7580,0.7804,0.8030,0.8259,0.8490,0.8723,0.8959,
0.9198,0.9440,0.9684,0.9932,1.0182,1.0436,1.0692,1.0952,
1.1215,1.1481,1.1750,1.2023,1.2300,1.2580,1.2864,1.3152,
1.3444,1.3741,1.4042,1.4347,1.4656,1.4971,1.5290,1.5613,
1.5942,1.6276,1.6616,1.6961,1.7312,1.7668,1.8031,1.8400,
1.8776,1.9161,1.9552,1.9951,2.0358,2.0773,2.1196,2.1627,
2.2068,2.2518,2.2978,2.3448,2.3929,2.4422,2.4926,2.5442,
2.5971,2.6523,2.7090,2.7672,2.8271,2.8888,2.9523,3.0177,
3.0852,3.1553,3.2277,3.3028,3.3805,3.4613,3.5453,3.6328,
3.7240,3.8359,3.9540,4.0791,4.2121,4.3546,4.5074,4.6722,
4.8509,5.0809,5.3390,5.6343,5.9777,6.4659,7.1046,8.2314

Reconstruction levels for 1 bit
0.7071
Reconstruction levels for 2 bits
0.4710,2.0515
Reconstruction levels for 3 bits
0.2459,0.8857,1.7948,3.3042
Reconstruction levels for 4 bits
0.1240,0.4048,0.7287,1.1110,1.5778,2.1773,3.0169,4.4311
Reconstruction levels for 5 bits
0.0621,0.1941,0.3348,0.4855,0.6479,0.8239,1.0158,1.2271,
1.4620,1.7265,2.0295,2.3841,2.8133,3.3572,4.1438,5.5580
Reconstruction levels for 6 bits
0.0311,0.0951,0.1611,0.2292,0.2996,0.3724,0.4479,0.5261,
0.6073,0.6919,0.7799,0.8718,0.9679,1.0686,1.1743,1.2857,
1.4033,1.5280,1.6605,1.8019,1.9537,2.1178,2.2958,2.4901,
2.7059,2.9483,3.2226,3.5384,3.9402,4.4841,5.2706,6.6848
Reconstruction levels for 7 bits
0.0155,0.0471,0.0791,0.1116,0.1446,0.1781,0.2122,0.2468,
0.2820,0.3178,0.3542,0.3913,0.4290,0.4674,0.5065,0.5464,
0.5870,0.6285,0.6707,0.7139,0.7579,0.8029,0.8488,0.8958,
0.9438,0.9930,1.0434,1.0950,1.1479,1.2022,1.2578,1.3150,
1.3739,1.4344,1.4968,1.5611,1.6274,1.6958,1.7665,1.8397,
1.9157,1.9947,2.0768,2.1623,2.2513,2.3443,2.4416,2.5435,
2.6516,2.7664,2.8878,3.0167,3.1541,3.3014,3.4597,3.6309,
3.8328,4.0752,4.3495,4.6653,5.0671,5.6109,6.3975,7.8117
Reconstruction levels for 8 bits
0.0078,0.0234,0.0392,0.0551,0.0711,0.0872,0.1035,0.1198,
0.1363,0.1530,0.1697,0.1866,0.2037,0.2208,0.2381,0.2556,
0.2732,0.2910,0.3089,0.3269,0.3451,0.3635,0.3820,0.4007,
0.4196,0.4386,0.4578,0.4772,0.4968,0.5165,0.5364,0.5565,
0.5769,0.5974,0.6181,0.6390,0.6602,0.6815,0.7031,0.7249,
0.7469,0.7692,0.7916,0.8144,0.8373,0.8606,0.8840,0.9078,
0.9318,0.9561,0.9807,1.0056,1.0308,1.0563,1.0821,1.1082,
1.1347,1.1615,1.1886,1.2161,1.2439,1.2721,1.3007,1.3297,
1.3591,1.3890,1.4193,1.4500,1.4812,1.5129,1.5450,1.5777,
1.6108,1.6445,1.6787,1.7135,1.7489,1.7848,1.8214,1.8587,
1.8967,1.9355,1.9750,2.0153,2.0563,2.0982,2.1409,2.1845,
2.2290,2.2746,2.3211,2.3686,2.4173,2.4671,2.5181,2.5703,
2.6243,2.6803,2.7377,2.7967,2.8575,2.9200,2.9845,3.0509,
3.1197,3.1909,3.2646,3.3409,3.4202,3.5025,3.5881,3.6774,
3.7785,3.8933,4.0147,4.1436,4.2810,4.4283,4.5866,4.7578,
4.9596,5.2021,5.4764,5.7922,6.1939,6.7378,7.5243,8.9385

Simulation Results

Figure 5:
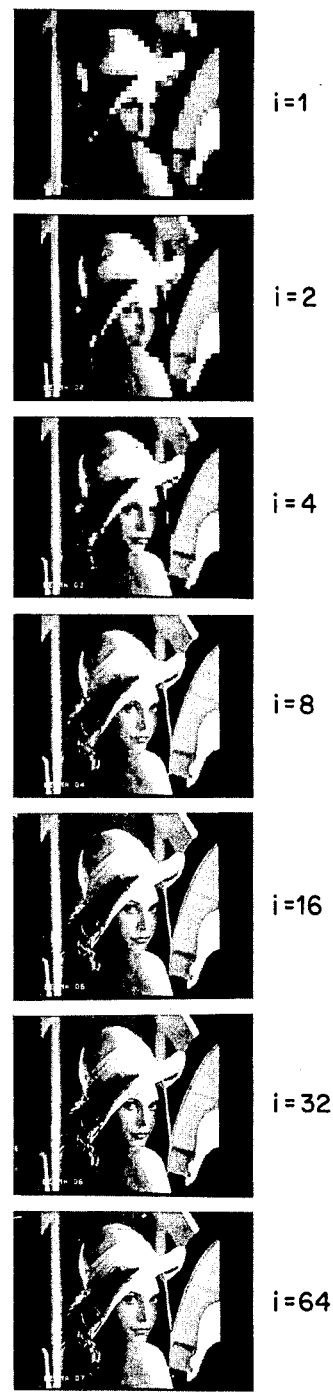
FIG. 5 illustrates corresponding stages in the progressive reconstruction of an image in accordance with prior art techniques.

FIGS. 4 and 5 are simulations illustrating the progressive transmission and reconstruction schemes in accordance with the present invention and in accordance with the zig-zag scanning approach as described for example in the above-mentioned article by Tescher and Cox. In each example the original image data consists of 512×512 pixels with 8 bits per pixel. Each zone or block is 16×16 pixels. In the system in accordance with the present invention the bit assignment maps were designed based upon rate-distortion theory. In quantizing the bits for the prior art zig-zag scanning scheme, an 8-bit nonuniform quantizer in accordance with the teachings in an article by Max "Quantization for Minimum Distortion" IEEE Transaction-Information Theory, vol IT-6, pp 7–12, March 1960 was employed.

The series of pictures in FIGS. 4 and 5 show the corresponding reconstructed images with data content of 1/32, 1/16, ⅛, ¼, ½, 1, and 2 bits/pixel. These pictures simulate transmission and reception of data at a 1/32 bit/pixel iteration for the first, second, fourth, eighth, sixteenth, thirty-second, and sixty-fourth iteration, respectively.

As can be seen from FIGS. 4 and 5 during the earlier iterations the system in accordance with the present invention provides reconstructed images of finer detail and therefore superior picture quality than does the zig-zag scanning approach. After an accumulated data of the order of 1 bit/pixel (i=32), both systems produce good images and the difference in picture quality becomes almost indistinguishable. Eventually, upon continuing the transmission and reconstruction, both schemes employ the accumulated data of 8 bits/pixel and assign the full 8 bits to each transform coefficient. At this stage the quality of the quantizing and dequantizing scheme determines the superior picture quality.

Thus, the progressive transmission and reconstruction scheme for transformed images in accordance with the present invention is more efficient in delivering image quality than the zig-zag scanning approach. The reconstructed images from the two systems show different characteristics; those from the zig-zag scanning approach appear smoother, whereas those produced in accordance with the present invention contain more detail. Subjective comparison indicates that the approach in accordance with the present invention is more than twice as efficient as the zig-zag approach in delivering the details of an image at low bit rates.

While there has been shown and described what is considered a preferred embodiment of the present invention, it will be obvious to those skilled in the art that various changes and modifications may be made therein without departing from the invention as defined by the appended claims.

What is claimed is:

1. The method of progressively transmitting an image comprising
   dividing an image into a predetermined array of zones of picture elements;
   performing a predetermined spatial domain-to-transform domain transformation of the picture elements of each zone to provide a set of transform coefficients thereof;
   producing and transmitting for each zone during the first of a plurality of transmission sequences signals containing data representing several of the transform coefficients of the set in different degrees of detail; and
   producing and transmitting for each zone during each subsequent sequence of said plurality of sequences signals containing data on several of the transform coefficients of the set which when combined with data transmitted during preceding sequences provide cumulative data representing the set of transform coefficients of the zone in different degrees of increasingly finer detail.

2. The method in accordance with claim 1 wherein each of said zones represents an image area of uniform size and shape having an equal number of picture elements.

3. The method in accordance with claim 2 wherein said predetermined spatial domain-to-transform domain transformation is a discrete cosine transformation.

4. The method of progressively transmitting an image comprising
   dividing an image into a predetermined array of blocks of picture elements;
   performing a predetermined spatial domain-to-transform domain transformation in two dimensions of the picture elements of each block to provide transform coefficients thereof;
   quantizing transform coefficients of each block into a series of predetermined sets of quantized transform coefficients, some of the quantized transform coefficients of each set representing their corresponding transform coefficients in different degrees of detail, and the quantized transform coefficients of each set except the first set of the series representing the transform coefficients of the block in finer detail than the preceding set; and
   transmitting during each of a plurality of transmission sequences signals representing the differences between each of the quantized transform coefficients of each set and each of the corresponding quantized transform coefficients of the preceding set of the series for each of said blocks.

5. The method in accordance with claim 4 wherein each of said blocks represents an image area of uniform size and shape having an equal number of picture elements.

6. The method in accordance with claim 5 wherein the quantized transform coefficients of each set of each block are represented by a number of bits, different numbers of bits being assigned to each quantized transform coefficient of each set to represent the corresponding transform coefficient in different degrees of detail.

7. The method in accordance with claim 6 wherein the number of bits assigned to individual quantized transform coefficients is increased for succeeding sets of the series by the addition of bits of decreasing significant value whereby the transform coefficients are represented in increasingly finer detail.

8. The method in accordance with claim 7 wherein the first set of quantized transform coefficients of the series includes a predetermined total number of bits; and
   each set of quantized transform coefficients of the series except the first set includes a total number of bits which is greater than the total number of bits of the preceding set by said predetermined total number of bits whereby said predetermined total number of bits are transmitted during each of said plurality of transmission sequences.

9. The method in accordance with claim 8 wherein said predetermined spatial domain-to-transform domain transformation is a discrete cosine transformation.

10. The method of progressively transmitting and reconstructing an image comprising
    dividing an image into a predetermined array of zones of picture elements;
    performing a predetermined spatial domain-to-transform domain transformation of the picture elements of each zone to provide a set of transform coefficients thereof;

producing and transmitting for each zone during the first of a plurality of transmission sequences signals containing data representing several of the transform coefficients of the set in different degrees of detail;

producing and transmitting for each zone during each subsequent sequence of said plurality of sequences signals containing data on several of the transform coefficients of the set which when combined with data transmitted during preceding sequences provide cumulative data representing the set of transform coefficients of the zone in different degrees of increasingly finer detail;

receiving for each zone said signals containing data representing several of the transform coefficients of the set in different degrees of detail transmitted during said first of said plurality of transmission sequences and said signals containing data on several of the transform coefficients of the set transmitted during each subsequent sequence of said plurality of transmission sequences;

combining signals containing data on transform coefficients transmitted during each transmission sequence subsequent to the first with corresponding signals transmitted during preceding transmission sequences including the first to provide cumulative signals containing data on the set of transform coefficients for each zone; and performing the inverse of said predetermined spatial domain-to-transform domain transformation of cumulative signals containing data on the set of transform coefficients for each zone after selected transmission sequences to provide reconstituted image data for each picture element of each zone, the reconstituted image data being of finer detail after later transmission sequences in the plurality.

11. The method in accordance with claim 10 wherein each of said zones represents an image area of uniform size and shape having an equal number of picture elements.

12. The method in accordance with claim 11 wherein said predetermined spatial domain-to-transform domain transformation is a discrete cosine transformation.

13. The method of progressively transmitting and reconstructing an image comprising dividing an image into a predetermined array of blocks of picture elements;

performing a predetermined spatial domain-to-transform domain transformation in two dimensions of the picture elements of each block to provide transform coefficients thereof;

quantizing transform coefficients of each block into a series of predetermined sets of quantized transform coefficients, some of the quantized transform coefficients of each set representing their corresponding transform coefficients in different degrees of detail, and the quantized transform coefficients of each set except the first set of the series representing the transform coefficients of the block in finer detail than the preceding set;

transmitting during each of a plurality of transmission sequences signals representing the differences between each of the quantized transform coefficients of each set and each of the corresponding quantized transform coefficients of the preceding set of the series for each of said blocks;

receiving said signals representing the differences between each of the quantized transform coefficients of each set and each of the corresponding quantized transform coefficients of the preceding set of the series for each of said blocks during each of said plurality of transmission sequences;

combining the signals representing the differences between each of the quantized transform coefficients of each set and each of the corresponding quantized transform coefficients of the preceding set of the series for each of said blocks associated with each transmission sequence with the corresponding signals associated with previous transmission sequences of the plurality to provide cumulative quantized transform coefficients representing the transform coefficients of the block in increasingly finer detail after each transmission sequence of the plurality;

dequantizing the cumulative quantized transform coefficients to reconstituted transform coefficients; and performing the inverse of said predetermined spatial domain-to-transform domain transformation in two dimensions of the reconstituted transform coefficients for each block after selected transmission sequences to provide reconstituted image data for each picture element of each block, the reconstituted image data being of finer detail after later transmission sequences in the plurality.

14. The method in accordance with claim 13 wherein each of said blocks represents an image area of uniform size and shape having an equal number of picture elements.

15. The method in accordance with claim 14 wherein the quantized transform coefficients of each set of each block are represented by a number of bits, different numbers of bits being assigned to each quantized transform coefficient of each set to represent the corresponding transform coefficient in different degrees of detail.

16. The method in accordance with claim 15 wherein the number of bits assigned to individual quantized transform coefficients is increased for succeeding sets of the series by the addition of bits of decreasing significant value whereby the transform coefficients are represented in increasingly finer detail.

17. The method in accordance with claim 16 wherein the first set of quantized transform coefficients of the series includes a predetermined total number of bits; and each set of quantized transform coefficients of the series except the first set includes a total number of bits which is greater than the total number of bits of the preceding set by said predetermined total number of bits whereby said predetermined total number of bits are transmitted during each of said plurality of transmission sequences.

18. The method in accordance with claim 17 wherein said predetermined spatial domain-to-transform domain transformation is a discrete cosine transformation.

19. The method in accordance with claim 18 wherein the transform coefficients of each block include a DC transform coefficient having a Gaussian distribution, the other transform coefficients of the block being AC transform coefficients having a Laplacian distribution;

the threshold levels for quantizing of the DC transform coefficient into different numbers of bits and the reconstructed levels for dequantizing the cumulative quantized DC transform coefficients to DC transform coefficients are selected to provide threshold levels which are aligned for the different numbers of bits of quantizing for a nonuniform Gaussian distributed value; and the threshold levels for quantizing of the AC transform coefficients into different numbers of bits and the reconstructed levels for dequantizing the cumulative quantized AC transform coefficients to reconstituted AC transform coefficients are selected to provide threshold levels which are aligned for the different numbers of bits of quantizing for a nonuniform Laplacian distributed value.

20. A system for progressively transmitting an image comprising means for dividing an image into a predetermined array of zones of picture elements;

transform means for performing a predetermined spatial domain-to-transform domain transformation of the picture elements of each zone to provide a set of transform coefficients thereof; and means for producing and transmitting for each zone during the first of a plurality of transmission sequences signals containing data representing several of the transform coefficients of the set in different degrees of detail, and for producing and transmitting for each zone during each subsequent sequence of said plurality of sequences signals containing data on several of the transform coefficients of the set which when combined with data transmitted during preceding sequences provide cumulative data representing the set of transform coefficients of the zone in different degrees of increasingly finer detail.

21. A system in accordance with claim 20 wherein each zone of picture elements into which the image is divided by the means for dividing an image represents an image area of uniform size and shape having an equal number of picture elements.

22. A system in accordance with claim 21 wherein the spatial domain-to-transform domain transformation performed by said transform means is a discrete cosine transformation.

23. A system for progressively transmitting an image comprising means for dividing an image into a predetermined array of blocks of picture elements;

transform means for performing a predetermined spatial domain-to-transform domain transformation in two dimensions of the picture elements of each block to provide transform coefficients thereof;

quantizer means for quantizing transform coefficients of each block into a series of predetermined sets of quantized transform coefficients, some of the quantized transform coefficients of each set representing their corresponding transform coefficients in different degrees of detail, and the quantized transform coefficients of each set except the first set of the series representing the transform coefficients of the block in finer detail than the preceding set; and means for transmitting during each of a plurality of transmission sequences signals representing the differences between each of the quantized transform coefficients of each set and each of the corresponding quantized transform coefficients of the preceding set of the series for each of said blocks.

24. A system in accordance with claim 23 wherein each block of picture elements into which the image is divided by the means for dividing an image represents an image area of uniform size and shape having an equal number of picture elements.

25. A system in accordance with claim 24 wherein said quantizer means quantizes the transform coefficients of each set of each block into a number of bits representing the quantized transform coefficients, different numbers of bits being assigned to each quantized transform coefficient of each set to represent the corresponding transform coefficients in different degrees of detail.

26. A system in accordance with claim 25 wherein said quantizer means quantizes the transform coefficients of each block into a first set of the series of quantized transform coefficients having a predetermined total number of bits; and said quantizer means quantizes the transform coefficients of each block into sets of the series of quantized transform coefficients except the first set which have a total number of bits greater than the total number of bits of the preceding set by said predetermined total number of bits whereby said predetermined total number of bits is transmitted during each of said plurality of transmission sequences.

27. A system in accordance with claim 26 wherein the spatial domain-to-transform domain transformation performed by said transform means is a discrete cosine transformation.

28. A system for progressively transmitting and reconstructing an image comprising means for dividing an image into a predetermined array of zones of picture elements;

transform means for performing a predetermined spatial domain-to-transform domain transformation of the picture elements of each zone to provide a set of transform coefficients thereof;

means for producing and transmitting for each zone during the first of a plurality of transmission sequences signals containing data representing several of the transform coefficients of the set in different degrees of detail, and for producing and transmitting for each zone during each subsequent sequence of said plurality of sequences signals containing data on several of the transform coefficients of the set which when combined with data transmitted during preceding sequences provide cumulative data representing the set of transform coefficients of the zone in different degrees of increasingly finer detail;

receiver means for receiving for each zone said signals containing data representing several of the transform coefficients of the set in different degrees of detail transmitted during said first of said plurality of transmission sequences and said signals containing data on several of the transform coefficients of the set transmitted during each subsequent sequence of said plurality of transmission sequences;

means for combining signals containing data on transform coefficients transmitted during each transmission sequence subsequent to the first with corresponding signals transmitted during preceding transmission sequences including the first to provide cumulative signals containing data on the set of transform coefficients for each zone; and inverse transform means for performing the inverse of said predetermined spatial domain-to-transform domain transformation of cumulative signals containing data on the set of transform coefficients for each zone after selected transmission sequences to provide reconstituted image data for each picture element of each zone, the reconstituted image data being of finer detail after later transmission sequences in the plurality.

29. A system in accordance with claim 28 wherein each zone of picture elements into which the image is divided by the means for dividing an image represents an image area of uniform size and shape having an equal number of picture elements.

30. A system in accordance with claim 29 wherein the spatial domain-to-transform domain transformation performed by said transform means is a discrete cosine transformation.

31. A system for progressively transmitting and reconstructing an image comprising means for dividing an image into a predetermined array of blocks of picture elements;

transform means for performing a predetermined spatial domain-to-transform domain transformation in two dimensions of the picture elements of each block to provide transform coefficients thereof;

quantizer means for quantizing transform coefficients of each block into a series of predetermined sets of quantized transform coefficients, some of the quantized transform coefficients of each set representing their corresponding transform coefficients in different degrees of detail, and the quantized transform coefficients of each set except the first set of the series representing the transform coefficients of the block in finer detail than the preceding set;

means for transmitting during each of a plurality of transmission sequences signals representing the differences between each of the quantized transform coefficients of each set and each of the corresponding quantized transform coefficients of the preceding set of the series for each of said blocks;

receiver means for receiving said signals representing the differences between each of the quantized transform coefficients of each set and each of the corresponding quantized transform coefficients of the preceding set of the series for each of said blocks during each of said plurality of transmission sequences;

means for combining the signals representing the differences between each of the quantized transform coefficients of each set and each of the corresponding quantized transform coefficients of the preceding set of the series for each of said blocks associated with each transmission sequence with the corresponding signals associated with previous transmission sequences of the plurality to provide cumulative quantized transform coefficients representing the transform coefficients of the block in increasingly finer detail after each transmission sequence of the plurality;

dequantizer means for dequantizing the cumulative quantized transform coefficients to reconstituted transform coefficients; and inverse transform means for performing the inverse of said predetermined spatial domain-to-transform domain transformation in two dimensions of the reconstituted transform coefficients for each block after selected transmission sequences to provide reconstituted image data for each picture element of each block, the reconstituted image data being of finer detail after later transmission sequences in the plurality.

32. A system in accordance with claim 31 wherein each block of picture elements into which the image is divided by the means for dividing an image represents an image area of uniform size and shape having an equal number of picture elements.

33. A system in accordance with claim 32 wherein said quantizer means quantizes the transform coefficients of each set of each block into a number of bits representing the quantized transform coefficients, different numbers of bits being assigned to each quantized transform coefficient of each set to represent the corresponding transform coefficients in different degrees of detail.

34. A system in accordance with claim 33 wherein said quantizer means quantizes the transform coefficients of each block into a first set of the series of quantized transform coefficients having a predetermined total number of bits; and said quantizer means quantizes the transform coefficients of each block into sets of the series of quantized transform coefficients except the first set which have a total number of bits greater than the total number of bits of the preceding set by said predetermined total number of bits whereby said predetermined total number of bits is transmitted during each of said plurality of transmission sequences.

35. A system in accordance with claim 34 wherein the spatial domain-to-transform domain transformation performed by said transform means is a discrete consine transformation.

* * * * *